Feb. 9, 1960 L. M. SCHMIDT ET AL 2,924,669

ENDLESS TAPE MEMORY SYSTEM

Filed June 27, 1957 3 Sheets-Sheet 1

*INVENTORS*
LOTHAR M. SCHMIDT
HAROLD L. SCHWARTZ

*BY* Geo. Sievers

ATTORNEY

Feb. 9, 1960 L. M. SCHMIDT ET AL 2,924,669

ENDLESS TAPE MEMORY SYSTEM

Filed June 27, 1957 3 Sheets-Sheet 2

*INVENTORS*
LOTHAR M. SCHMIDT
HAROLD L. SCHWARTZ

*BY*

ATTORNEY

Feb. 9, 1960 L. M. SCHMIDT ET AL 2,924,669

ENDLESS TAPE MEMORY SYSTEM

Filed June 27, 1957 3 Sheets-Sheet 3

INVENTORS
LOTHAR M. SCHMIDT
HAROLD L. SCHWARTZ
BY
G. W. Leeven
ATTORNEY

United States Patent Office 2,924,669

Patented Feb. 9, 1960

2,924,669

ENDLESS TAPE MEMORY SYSTEM

Lothar M. Schmidt, Glendale, and Harold L. Schwartz, Los Angeles, Calif., assignors to Librascope, Incorporated, Glendale, Calif., a corporation of California Application June 27, 1957, Serial No. 668,356

18 Claims. (Cl. 179—100.2)

This invention relates to a recording and/or reproducing system wherein the major portion of a travelling endless tape is stored in a magazine with a minor portion of the tape travelling in a loop past a transducing station outside the magazine. The invention may be embodied in various systems for handling various kinds of record tapes for various specific purposes. For example, the endless tape may comprise a photographic film for repeatedly projecting a cycle of images on a screen, or may comprise a magnetic tape for the cyclic reproduction of information, or may comprise punched tape for such purposes as the automatic control of cycles of operation.

Briefly described our invention comprises a multiple track magnetic tape memory system for use in computers or the like wherein the magnetic record tape is run continuously past transducing means to receive information for memory storage and for repeated access to the stored information, and the tape is stored in a magazine in serpentine folds. A stiffening cup is provided at the entrance of the tape into the magazine. Striations are provided on the surface of the inside of the magazine to reduce friction on the tape and external tensioning means are provided between the exit and entrance to prevent flapping etc. of the tape.

One object of this invention is to provide a system for controlling the path and rate of travel of the tape loop by the application of driving force and retarding force at spaced points of the tape and of maintaining communication between the tape and the transducing means at high speeds.

A further object of this invention is the elimination of wear by avoiding the usual frictional contact of the oxide coating with the transducing means.

A further object of this invention is the combination of a special drive sprocket and a special drag sprocket to place the travelling loop of tape under constant tension across the arcuate guide surface at the transducing station.

A still further object of this invention is to provide a system which stores the major portion of an endless tape in a manner that permits the tape to travel at high speed with exceedingly little wear and stores the travelling tape in random serpentine folds.

A further object of this invention is to provide a storage magazine, the bottom surface of which has striations, or minute ribs, that support the travelling serpentine folds by substantially point contact with the bottom edge of the tape.

A further object of this invention is to provide a bowing means for stiffening the tape as it is fed into the magazine.

A further object of this invention is to provide a magazine cartridge which may be used interchangeably with the array of tape-controlling components.

The various features and advantages of the invention will be apparent from the following detailed description together with the accompanying drawings.

In the drawings, which are to be regarded as merely illustrative:

*General arrangement*

Figure 1:
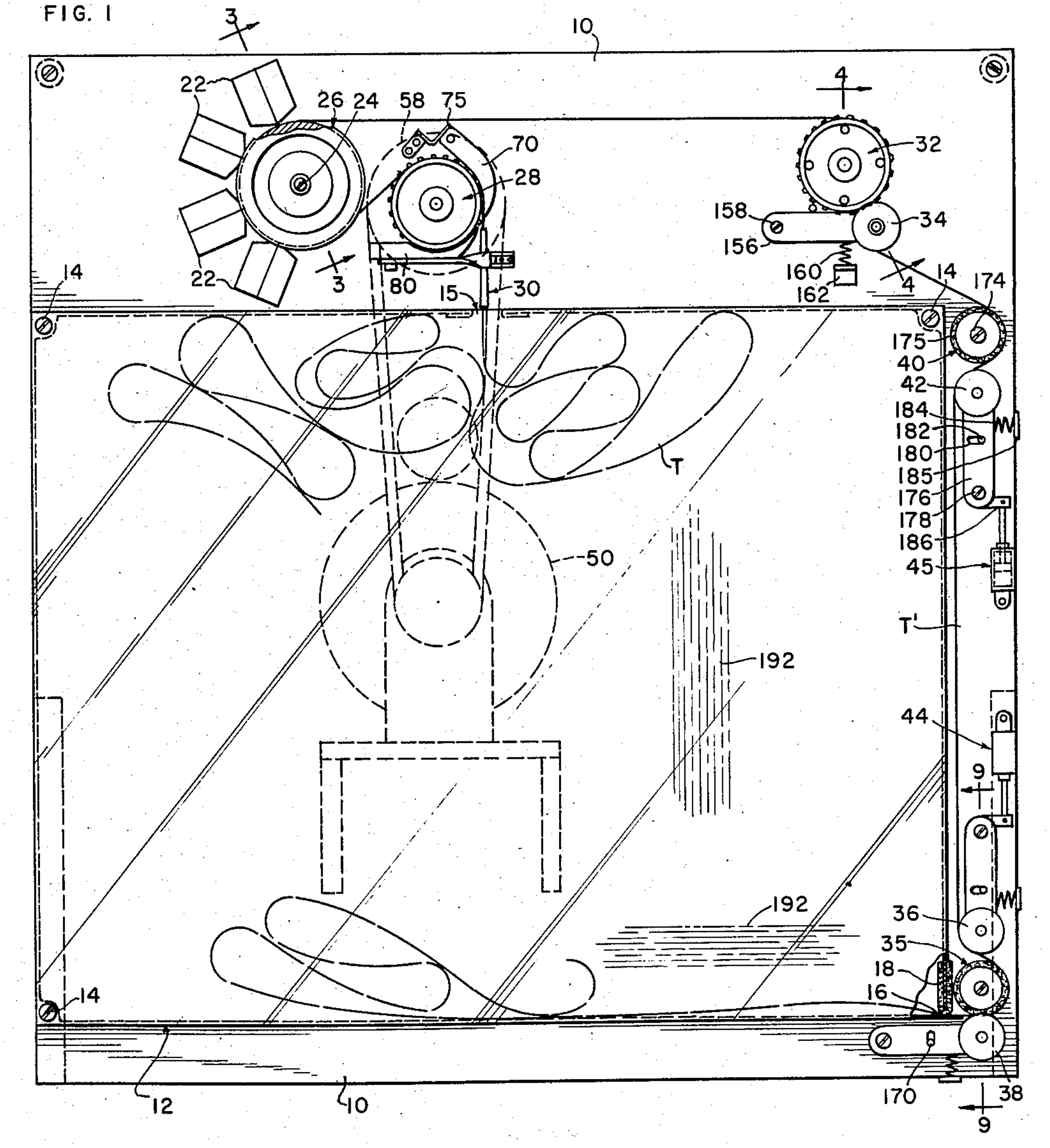
Figure 1 is a plan view of the presently preferred embodiment of the memory tape system showing how the array of components is positioned along two adjacent sides of a rectangular tape magazine.

As shown in Figure 1, the embodiment of the invention selected for the present disclosure includes a base plate 10 on which a tape magazine, generally designated by numeral 12, and an array of tape-controlling components are mounted. The magazine 12 may be in the form of a shallow horizontally positioned box and is preferably mounted on the base plate 10 in a quickly detachable manner, for example, by corner screws 14. The tape magazine 12 has a relatively wide entrance 15 for the tape and has a tape exit 16 that is preferably narrowed by a felt wiper 18.

Figure 3:
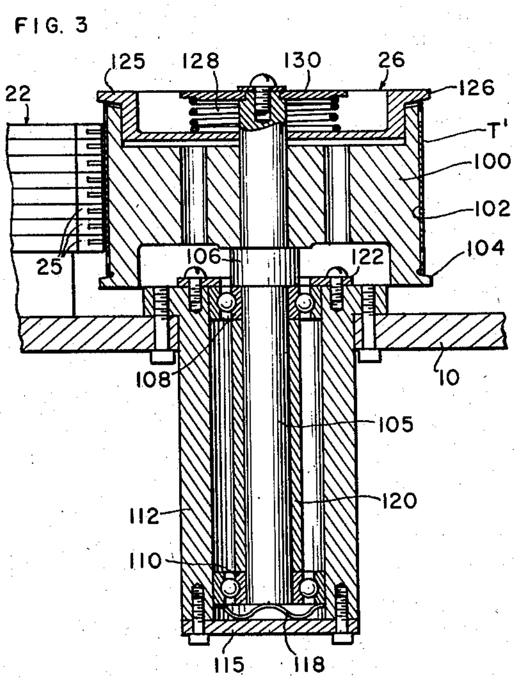
Figure 3 is an enlarged diametrical sectional view of the rotary drum that guides the tape past the transducing means, the section being taken as indicated by the line 3—3 of Figure 1.

A magnetic record tape T is stored in the magazine 12 in serpentine folds, as indicated in Figure 1 of the drawings. The magnetic record tape T in this instance is 35 mm. wide, and, like 35 mm. film, is formed with two rows of sprocket holes 20 (Figure 9) along its two longitudinal margins respectively. A loop T′ of the tape T extends from the magazine exit 16 past a transducing station to the magazine entrance 15. In this instance the transducing means comprises four banks 22 of transducers arranged in a circularly curved row concentric to an axis 24. Each of the banks 22 comprises a vertical row of individual transducers 25, as best shown in Figure 3 for writing and reading along multiple tracks in the central longitudinal zone of the coated tape T.

Figure 4:
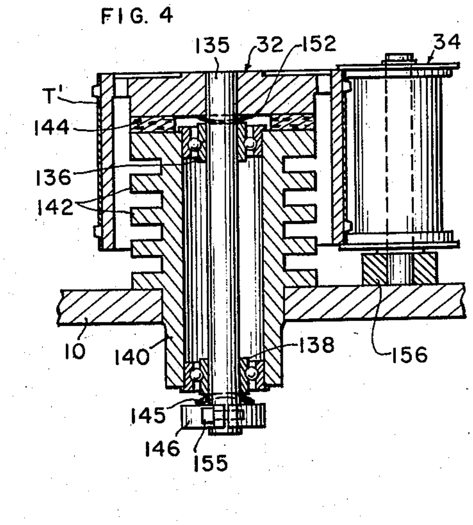
Figure 4 is a sectional view on an enlarged scale, taken on the line 4—4 of Figure 1 and shows the construction of the drag sprocket that cooperates with the drive sprocket to place the travelling tape under tension at the transducing station.
Figures 5, 6, 7, 8:
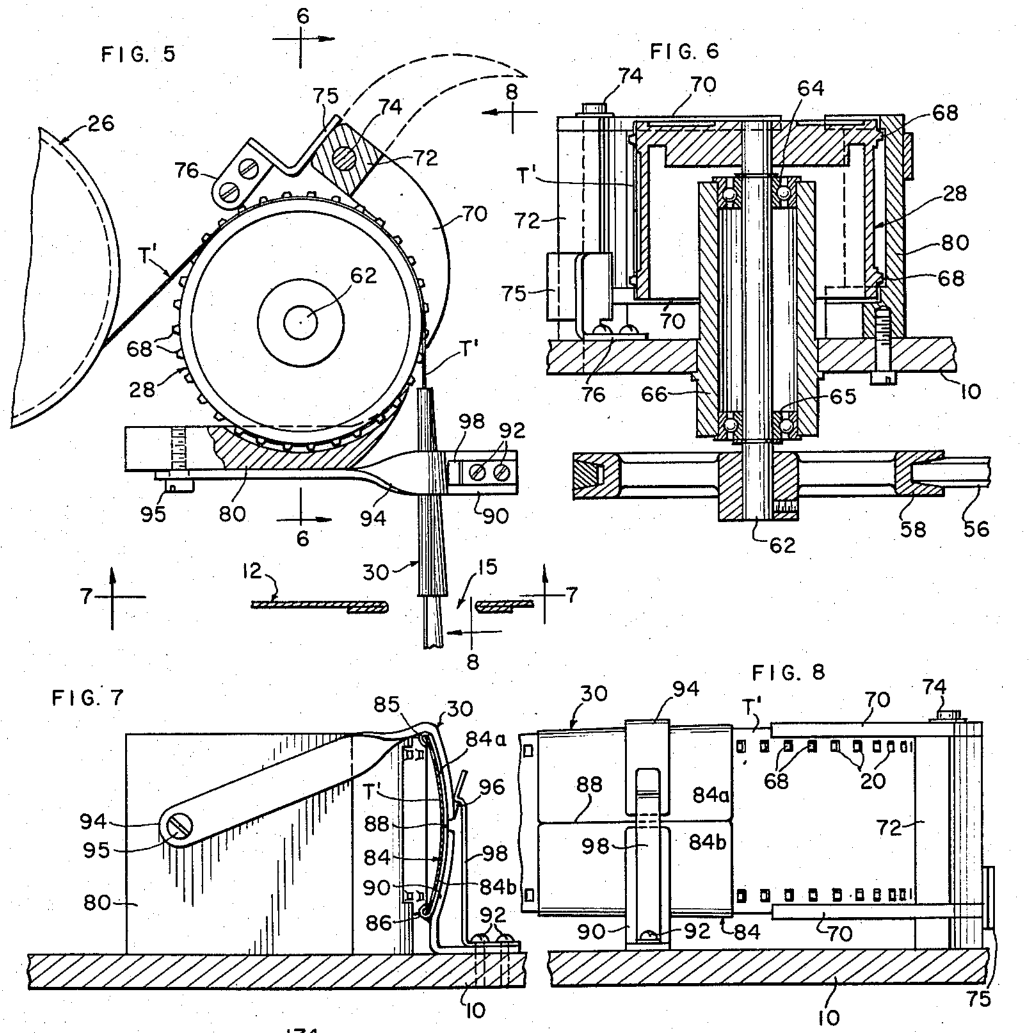
Figure 5 is a fragmentary plan view, partly in section, showing the drive sprocket and associated structure including the tape-bowing guide for directing the tape into the entrance of the magazine.
Figure 6 is a sectional view through the drive sprocket taken as indicated by the line 6—6 of Figure 5.
Figure 7 is an elevational view of the tape-bowing guide and associated structure as viewed along the line 7—7 of Figure 5.
Figure 8 is a side elevation of the tape-bowing guide and associated structure as seen along the line 8—8 of Figure 5.

The array of components of the present embodiment of the invention for controlling the tape loop T′ includes a rotary guide drum 26 (Figures 1, 3 and 5) to guide the tape past the banks 22 of transducers, a drive sprocket 28 in actuating engagement with the tape, a tape-bowing guide 30 shown in detail in Figures 5, 7 and 8 to direct the tape into the magazine entrance 15, a drag sprocket 32 (Figures 1 and 4) to resist the travel of the tape and thereby cooperate with the drive sprocket 28 to place the tape under tension against the guide drum 26, and an idler roller 34 to hold the tape in engagement with the drag sprocket 32. It can be seen in Figure 1 that these particular components of the array are arranged on the base plate 10 along the entrance side of the magazine 12.

The remaining components of the array control the travel of the tape loop T' from the magazine exit 16 to the drag sprocket 32 and compensate for variations in the resistance to withdrawal of the tape from the magazine 12. These remaining components of the array are arranged along the side or end of the magazine 12 that is adjacent the entrance side of the magazine.

These additional components of the array include: a first stationary friction cylinder 35 for yielding opposition to travel of the tape loop T' immediately adjacent the magazine exit 16; a first spring-pressed tension roller 36 tending to offset the travelling tape laterally in a direction to increase the extent of the tape in engagement with the friction cylinder 35; an idler roller 38 that presses the travelling tape against the friction cylinder 35; a second stationary friction cylinder 40; and a second spring-pressed roller 42 exerting pressure laterally against the travelling tape in a direction to increase the extent to which the second friction cylinder 40 makes retarding contact with the tape.

Preferably the action of the first roller 36 that offsets the path of travel of the tape is modified by a corresponding damping means 44 and in like manner the action of the second roller 42 for offsetting the path of travel of the tape is modified by a second damping means 45.

*Details of construction*

A motor 50 actuates the drive sprocket 28, the motor being mounted on the under side of base plate 10. The motor shaft 50 is operatively connected by a belt 56 with a sheave 58 that actuates the drive sprocket 28.

As best shown in Figure 6 the sheave 58 is keyed to the lower end of an upright spindle 62 on which the drive sprocket 28 is mounted. The spindle 62 is mounted by two thrust ball bearings 64 and 65 in a bearing sleeve 66 that is mounted in the base plate 10 and extends upward through the base plate into the interior of the drive sprocket. The periphery of the drive sprocket 28 is provided with two spaced circumferential rows of sprocket teeth 68 to engage the two rows of sprocket holes 20 of the tape loop T'. The peripheral surface of the drive sprocket 28 is slightly reduced in diameter between the two rows of sprocket teeth 68 since the coated side of the tape is turned toward the drive sprocket and it is desirable to avoid contact between the drive sprocket and the intermediate portion of the tape coating between the two rows of sprocket holes which constitutes the zone in which information is recorded on the tape. Thus, only the unused marginal portions of the oxide coating of the tape that lie outside the two rows of sprocket holes 20 make actual contact with the drive sprocket 28.

As best shown in Figure 5, the drive sprocket 28 thrusts the travelling tape loop T' longitudinally into the tape-bowing guide 30, and suitable means must be provided to hold the travelling tape against the periphery of the drive sprocket up to the point of departure of the tape from the drive sprocket, and additional means should be provided beyond the point of departure to keep the tape from clinging to the drive sprocket. As shown in Figures 5, 6, 7 and 8, the means for holding the travelling tape in engagement with the drive sprocket 28 may comprise a pair of parallel, arcuately curved retaining fingers 70 that normally hug the marginal portions of the travelling tape outside the two rows of sprocket holes 20.

The two curved retaining fingers 70 are unitary with an inter-connecting block 72 of rectangular cross-sectional configuration that is suitably journaled on a fixed upright pin 74. The block 72 backs against an angular spring clip 75 which is formed with a base tongue 76 for anchorage to the base plate 10. As may be understood by reference to Figure 5, the angular spring clip 75 presses yieldingly against one of the sides of the rectangular block 72 and thus yieldingly holds the two retaining fingers 70 either in their effective position shown in solid lines in Figure 5 or in their alternate retracted position away from the drive sprocket indicated in broken lines in Figure 5. It is apparent that the retaining fingers 70 at their normal positions confine the travelling tape against the periphery of the drive sprocket up to the desired point of tangential departure of the travelling tape for entrance into the tape-bowing guide 30.

An auxiliary guide or guard means to keep the travelling tape from following the periphery of the drive sprocket beyond the desired point of tangential departure may comprise a tapered block 80 that is fixedly mounted on the base plate 10 (Figure 6), and follows the curved configuration of the drive sprocket as shown in Figure 5.

The tape-bowing guide 30 may be made of thin sheet metal to provide a longitudinal web 84, Figures 7 and 8, for contact with the tough uncoated side of the tape loop T' and to provide a pair of overhanging marginal flanges 85 and 86 to engage the opposite longitudinal edges of the travelling tape. The marginal edge flanges 85 and 86 converge slightly toward each other in the direction of tape travel, as may be seen in Figure 8, and the longitudinal web 84 correspondingly progressively increases in transverse curvature as may be seen in Figures 5 and 8 so that the travelling loop of tape is progressively restricted in width and progressively bowed to the desired degree as the tape issues from the guide 30.

Preferably, but not necessarily, the tape-bowing guide 30 is of split construction, being made in two longitudinal sections that may be separated to facilitate substitution of one endless record tape for another. For this purpose, as best shown in Figures 7 and 8, the web 84 of the tape guide is divided along a longitudinal line 88 into two separate sections 84*a* and 84*b*. The lower web section 84*b* that carries the lower marginal flange 86 is fixedly supported by a bracket 90 that is anchored to the base plate 10 by suitable screws 92. The upper web section 84*a* of the tape guide is supported by an angular arm 94 that is pivoted to the face of the block 80 by a suitable pivot stud 95. As shown in Figure 7, the angular arm 94 may be formed on its end with a latch shoulder 96 for releasable engagement by a leaf-spring latch member 98. The base of the latch member 98 may be anchored by the previously mentioned screws 92.

The construction of the rotary drum 26 for guiding the travelling tape past the banks 22 of transducers may be understood by reference to Figure 3. The rotary drum 26 has a circular body 100 that provides a cylindrical peripheral surface 102 for contact with the full width of the uncoated side of the tape. This circular body is formed with a circumferential bottom flange 104 that may be termed a guide flange since its purpose is to accurately align the lower edge of the travelling tape with reference to the transducer banks 22. The circular body 100 is mounted on an upright stub shaft 105 in abutment against a collar 106 that is formed on the shaft.

The stub shaft 105 is journaled by a pair of bearings 108 and 110 in a flanged bearing sleeve 112 that is mounted in the base plate 10. The lower end of the bearing sleeve 112 is closed by a disk 115. A wafer spring 118 backs against the disk 115 and presses upwards against the outer race of the lower thrust bearing 110. The force exerted by the wafer spring 118 is transmitted from the inner race of the lower thrust bearing 110 to a spacer sleeve 120 that thrusts against the inner race of the upper thrust bearing 108. Finally, the outer race of the upper thrust bearing 108 transmits the bearing-tightening force to a keeper ring 122 that is secured to the upper end of the bearing sleeve 112. The inner race of the upper thrust bearing 108 abuts the lower edge of the shaft collar 106 for accurately fixing the vertical position of the rotary drum body 100 with special reference to the lower guide flange 104.

The rotary drum 26 further includes means to yieldingly urge the travelling tape against the guide flange 104. For this purpose the upper end of the rotary drum body 100 is recessed to receive a cup-shaped member 125 in a sliding manner and this cup-shaped member forms an upper circumferential flange 126 that presses downward against the upper edge of the travelling tape T'. The desired pressure against the upper edge of the travelling tape is provided by a light coil spring 128 that is in compression between the cup-shaped member 125 and a disk 130.

The drag sprocket 32 which engages the sprocket holes 20 of the tape loop T' is of hollow configuration, as shown in Figure 4, and is fixedly mounted on the upper end of a stub shaft 135. The stub shaft 135 is journaled by an upper ball bearing 136 and a lower ball bearing 138 in a bearing sleeve 140. The bearing sleeve 140 is mounted in the base plate 10 and is formed with circumferential fins 142 to facilitate dissipation of heat generated by its retarding action.

In the construction shown resistance to rotation is accomplished by pressing the drag sprocket 32 downward against a suitable friction surface at the upper end of the bearing sleeve 140. For this purpose a washer 144 made of felt or other suitable material is interposed between the drag sprocket 32 and the bearing sleeve 140.

The required downward pressure against the felt washer 144 may be provided by a relatively heavy spring washer 145 that is confined under stress between a collar 146 on the lower end of the stub shaft 135 and bearing 138. The downward pull exerted by the spring washer 145 is modified by the lighter opposing force of a relatively light spring washer 152 that is confined under stress between the drag sprocket 32 and bearing 136 that rests on the top end of the bearing sleeve 140. The collar 146 is preferably of split construction and is provided with a screw 155 by means of which it may be tightened or loosened for adjustment along the stub shaft 135 to increase or decrease the stressing of the spring washer 145 for adjustment of the degree to which the drag sprocket opposes travel of the tape T'.

The idler roller 34 that holds the approaching tape against the drag sprocket 32 and in engagement with the sprocket teeth thereof is carried by an arm 156 that is mounted on a pivot 158. A suitable coiled spring 160 backed against a bracket 162 acts on the arm 156 to urge the idler roller against the drag sprocket 32.

Figure 9:
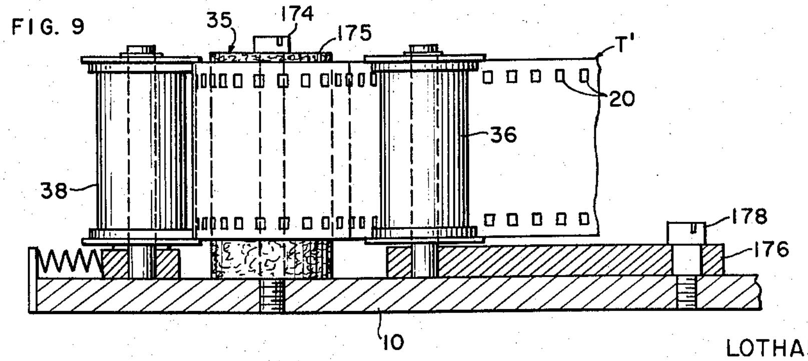
Figure 9 is an enlarged view, partly in side elevation and partly in section, taken as indicated by the line 9—9 of Figure 1 and showing the construction of a combination of elements that compensate for the fluctuating resistance to withdrawal of the tape from the magazine.

The idler roller 38 and its support, shown in Figures 1 and 9, is constructed the same as roller 34 and its support, except that a pin 170 may be provided to limit the movement thereof.

The first stationary friction cylinder 35 and the second stationary friction cylinder 40 are of the same construction. Each of these friction cylinders is fixedly anchored by a screw 174 and each has a surface of a suitable material for frictional resistance to movement of the travelling film. The material of the surface may be stainless steel, for example, or, as indicated in Figure 1, each of the two friction cylinders may be embraced by a fixed felt sleeve 175 for this purpose.

The two rollers 36 and 42 maintain tension on the tape T' to prevent slack, flapping and snapping. Both are mounted and controlled in the same manner. Each of the offsetting rollers 36 and 42 is carried by an arm 176 that is mounted on a pivot 178, the arm 176 having a slot 180 to receive a stop pin 182 for the purpose of limiting its range of movement. Each of the two arms 176 is urged toward the travelling tape by a coiled spring 184 that backs against a suitable bracket 185. In the present construction, each of the arms 176 has a lateral extension 186 near its pivot axis and this lateral extension is operatively connected to a previously mentioned damping means 44 or 45. The damping means comprises a simple dash pot of a well known type wherein a piston reciprocates in a cylinder, the piston being operatively connected to the lateral arm extension 186.

Figure 2:
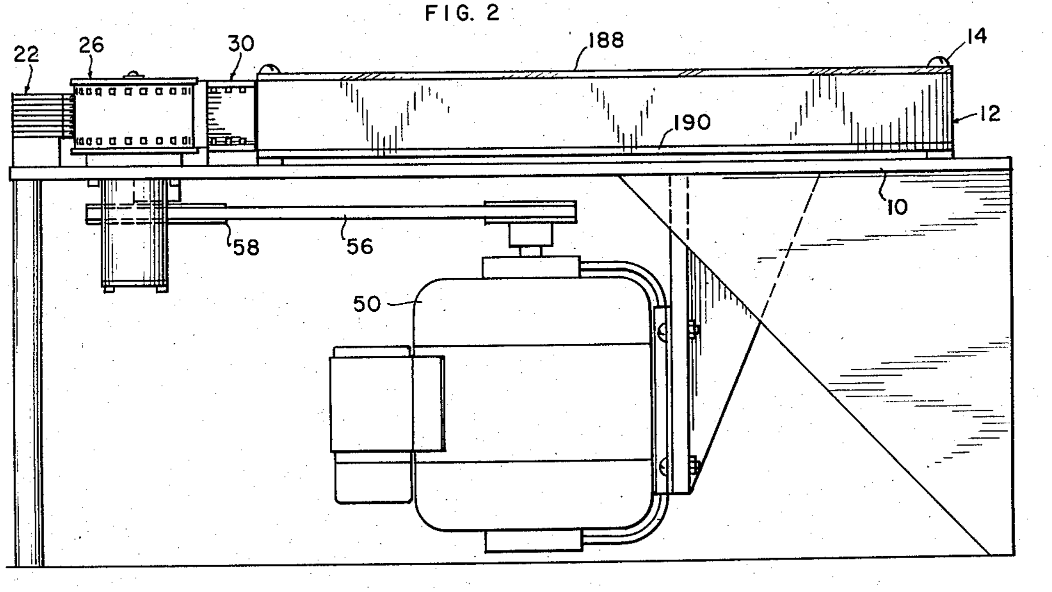
Figure 2 is an end elevational view of the apparatus showing how a drive sprocket for the tape is actuated by a motor under the magazine.

The magazine 12 for storing the traveling tape may be made of thin metal, and in practice it has been found that stainless steel has certain desirable advantages. The principal advantage is that it has an anti-static feature. The tape passing through the rollers, etc. has a tendency to collect static. The stainless steel plate effectively discharges this collection, and preferably has a transparent cover 188 (Figure 2) made of glass or a suitable plastic for observation of the travelling tape in the magazine. The bottom plate 190 of the magazine 12 has striations that are oriented in the general direction of travel of the travelling tape from the magazine entrance 50, in order to reduce the friction set up between the edge of the tape T and the surface of plate 190. Thus, the preferred orientation of the striations is indicated by the fine lines at 192 in Figure 1. In the preferred practice of the invention, the striations are provided by grinding a stainless steel plate (number 4 grind), the grinding being sufficiently coarse to make the minute striations visible to the naked eye. Preferably the striations are ground in two directions, to conform to the direction of movement of the tape T across the plate 180. The striations, as viewed in Figure 1, on the upper ⅞ of the plate are ground in a vertical direction and on the lower ⅛ of the plate they are ground at right angles thereto or horizontal.

*Operation*

The manner in which the described system operates to serve its purpose may be readily understood from the foregoing description. The power-actuated drive sprocket 28 forces the travelling tape into the tape-bowing guide 30 with the consequence that the tape is stiffened for a substantial distance into the interior of the magazine and thrusts aggressively against the serpentine folds in the magazine to continuously urge the mass of folds away from the magazine entrance. By continually seeking regions of least resistance the stored serpentine folds of the travelling tape continually adjust themselves to occupy all parts of the magazine. The fluctuations in the resistance by the tape to withdrawal from the magazine 12 causes corresponding oscillation of the two offsetting rollers 36 and 42 for compensating variation in the degree to which the travelling tape makes contact with the friction surfaces of the two stationary friction cylinders 35 and 40. These oscillations by the offsetting rollers are modified by the two damping means 44 and 45. By virtue of the offsetting rollers 36 and 42, the tape is kept sufficiently taut to keep the tape under control and the tape is fed at a constant rate to the drag sprocket 32.

The resistance to travel of the tape by the drag sprocket 32 in cooperation with the driving action of the drive sprocket 28 keeps the tape under constant tension around the guide drum 26 and the tape is continuously urged against the indexing flange 104 of the guide drum for accurate positioning of the tape relative to the banks 22 of transducers.

It is a simple matter to disengage the endless tape from the described array of components and to detach the magazine 12 from the base plate 10, so that one magazine with an endless tape therein may be quickly replaced by a second magazine with a second endless tape therein. The split construction of the tape-bowing guide 30 and the retractable mounting of the retaining fingers 70 facilitate the quick exchange of one endless tape for another.

Our description in specific detail of the selected embodiment of the invention will suggest various changes, substitutions and other departures from our disclosure within the spirit and scope of the appended claims.

We claim:

1. In a system wherein the major portion of a travelling endless record tape is stored in serpentine folds in a magazine with the tape travelling from the magazine to a transducing station and back to the magazine, means to feed the tape into the magazine comprising means to engage and drive the tape into said magazine, and means to bow the entering tape transversely for longitudinal stiffening thereof, said bowing means comprising a tape guide for movement of the tape longitudinally therethrough, said tape guide having flanges to engage the opposite longitudinal edges of the tape, said flanges progressively converging in the direction of tape travel to bow the tape transversely, said tape guide being longitudinally split into two sections, said sections being separable for the admission of the tape into the guide or removal from the guide whereby one endless tape may be substituted for another.

2. In a system wherein the major portion of a travelling endless record tape is stored in serpentine folds in a magazine with the tape travelling from the magazine to a transducing station and back to the magazine, means to feed the tape into the magazine comprising means outside the magazine to engage and drive the tape into the magazine, and means substantially outside the magazine to bow the travelling tape transversely for longitudinal stiffening thereof as the tape issues from the bowing means, said bowing means comprising a tape guide for movement of the tape longitudinally therethrough, said tape guide being directed toward the interior of the magazine and having flanges to engage the opposite longitudinal edges of the tape, said flanges progressively converging in the direction of tape travel to bow the tape transversely, said tape guide having a guide surface between its two edge-engaging flanges for contact with one face of the tape, said guide surface being progressively bowed transversely of the tape in accord with the progressive convergence of the edge-engaging flanges.

3. In a system wherein the major portion of a travelling endless record tape is stored in serpentine folds in a magazine with the tape travelling from the magazine to a transducing station and back to the magazine, means to feed the tape into the magazine comprising a tape guide directed into the interior of the magazine, said tape guide progressively bowing the tape transversely for longitudinal stiffening of the tape entering the magazine, a drive sprocket positioned adjacent said tape guide in generally tangential relation thereto, means normally confining the tape against said drive sprocket in positive engagement therewith near the region of departure of the tape from the drive sprocket, said confining means having a guide surface of substantially the same curvature as the drive sprocket and normally extending around a portion of the circumference of the drive sprocket, said confining means being retractable away from the drive sprocket to permit a tape to be engaged with and disengaged from the drive sprocket whereby a plurality of endless tapes may be used interchangeably in the system and guard means close to the periphery of the drive sprocket between the drive sprocket and the tangential path of the tape to the tape guide to keep the tape from following the periphery of the drive sprocket beyond the normal point of departure of the tape from the drive sprocket.

4. In a system employing a travelling endless record tape with sprocket holes therein and with a recording coating on one face of the tape, and in which a major portion of the travelling tape is stored in a magazine with a loop of the tape extending from an exit of the magazine to an entrance to the magazine, an array of components outside the magazine for driving said loop and for deriving information from the loop, said array including means providing an arcuate surface for contact with the uncoated face of said tape to guide the tape along a predetermined path, transducing means adjacent said path but spaced therefrom to derive data from the coated side of the tape without contact with the tape coating, a drive sprocket in driving engagement with the sprocket holes of the tape and positioned between said guide means and said entrance to pull the tape across said arcuate surface and to thrust the tape toward the entrance, and a drag sprocket between said guide means and said exit of the magazine in peripheral contact with the uncoated face of the tape and in engagement with the sprockets of the tape to yieldingly resist travel of the tape thereby to cooperate with said drive sprocket to maintain the tape in tension at said arcuate surface.

5. In a system employing a travelling endless record tape with sprocket holes along both margins thereof and with a recording coating on one face of the tape, and in which a major portion of the travelling tape is stored in a magazine with a loop of the tape extending from an exit of the magazine to an entrance of the magazine, an array of components outside the magazine for driving said loop and for deriving information from the loop, said array including transducing means to convey information to or from said coated side of the tape, means having an arcuately curved surface for contact with the uncoated side of said loop of the tape to guide the coated side of the tape past said transducing means but out of contact with the transducing means, a drive sprocket between said guide means and said entrance in actuating engagement with the tape loop, and a drag sprocket between said guide means and said exit in contact with the uncoated face of the tape to yieldingly resist travel of the tape thereby to cooperate with said drive sprocket to tension the tape into snug contact with the arcuately curved surface of said guide means, said drag sprocket comprising a rotary sprocket member having a first friction face normal to its axis of rotation and a stationary member having a second face in contact with said friction face.

6. A combination as set forth in claim 5 in which said sprocket member is hollow, said stationary member journals said sprocket member and extends into the interior thereof.

7. A combination as set forth in claim 6 in which said stationary member is formed with fins for heat dissipation.

8. In a system employing a travelling endless record tape with sprocket holes along both margins thereof and with a recording coating on one face of the tape, and in which a major portion of the travelling tape is stored in a magazine with a loop of the tape extending from an exit of the magazine to an entrance of the magazine, an array of components outside the magazine for driving said loop and for deriving information from the loop, said array including transducing means to convey information to or from said coated side of the tape, means having an arcuately curved surface for contact with the uncoated side of said loop of the tape to guide the coated side of the tape past said transducing means but out of contact with the transducing means, a drive sprocket between said guide means and said entrance in actuating engagement with the tape loop, means between said guide means and said exit to yieldingly resist travel of the tape thereby to cooperate with said drive sprocket to tension the tape into snug contact with the arcuately curved surface of said guide means, said drive sprocket having marginal circumferential portions in contact with the coated side of said tape outside the longitudinal zone of the tape that traverses said transducing means, the periphery of the drive sprocket between said marginal circumferential portions being of reduced diameter for spacing inwardly out of contact with said coated surface of the tape.

9. In a system employing a travelling endless record tape with sprocket holes along both margins thereof and with a recording coating on one face of the tape, and in which a major portion of the tape is stored in a magazine with a loop of the tape extending from an exit of the magazine to an entrance of the magazine, an array of components outside the magazine for driving said loop and for deriving information from the loop, said array including transducing means to convey information to or from said coated surface of the tape, a guide drum in rolling contact with the uncoated face of said tape to guide the coated face of the tape past the transducing means, a drive sprocket between said guide drum and said entrance in actuating engagement with the tape loop, and means between said guide drum and said exit to yieldingly resist travel of the tape thereby to cooperate with said drive sprocket to tension the tape into sung engagement with the periphery of said guide drum, said guide drum having a fixed circumferential guide flange in contact with one edge of the tape for accurate alignment of the tape with said transducing means and having a second flange yieldingly pressing against the other edge of the tape to hold said one edge against said guide flange.

10. In a system employing a travelling endless record tape with sprocket holes therein and with a recording coating on one face of the tape and in which a major portion of the travelling tape is stored in a magazine with a loop of the tape extending from an exit of the magazine to an entrance to the magazine, an array of components outside the magazine for driving said loop and for deriving information from the loop, said array including a guide means for peripheral contact with the uncoated face of said tape to guide the tape along a predetermined path, transducing means adjacent said path but spaced therefrom to derive data from the coated side of the tape without contact with the tape coating, a drive sprocket in driving engagement with the sprocket holes of the tape and positioned between said guide means and said entrance to pull the tape against the guide means and to thrust the tape toward the entrance, a drag sprocket between said guide means and said exit of the magazine in peripheral contact with the uncoated face of the tape and in engagement with the sprockets of the tape to yieldingly resist travel of the tape thereby to cooperate with said drive sprocket to maintain the tape in tension at said guide means, and an additional drag means between said drag sprocket and said exit from the magazine to yieldingly resist the travel of the tape from the magazine to said drag sprocket.

11. A combination as set forth in claim 10 which includes means to yieldingly offset the path of the travelling tape between said drag sprocket and said additional means to compensate for minor variations in the rate at which the tape issues from said exit.

12. A combination as set forth in claim 11 in which said offsetting means is in mechanical contact with the tape and which includes means to damp the fluctuation of said offsetting means.

13. In a system of the character described wherein the major portion of a travelling endless record tape is stored in a magazine with a loop of the tape outside the magazine extending from an exit of the magazine to an entrance of the magazine, an array of components outside the magazine for driving said loop and for conveying information to or from the loop, said array including transducing means, driving means to engage said tape between said transducing means and said entrance to actuate the tape, a second means engaging said tape between said transducing means and said exit to yieldingly resist travel of the tape thereby to cooperate with said driving means to tension the tape at said transducing means, and means between said second means and said exit to compensate for variations in the resistance to withdrawal of the tape from the magazine, said compensating means including means for frictionally engaging the tape for resistance to travel thereof and means to increase said frictional resistance in response to local acceleration of the tape at the frictionally engaging means.

14. In a system of the character described wherein the major portion of a travelling endless record tape is stored in a magazine with a loop of the tape outside the magazine extending from an exit of the magazine to an entrance of the magazine, an array of components outside the magazine for driving said loop and for conveying information to or from the loop, said array including transducing means, driving means to engage said tape between said transducing means and said entrance to actuate the tape, a second means engaging said tape between said transducing means and said exit to yieldingly resist travel of the tape thereby to cooperate with said driving means to tension the tape at said transducing means, and means between said second means and said exit to compensate for variations in the resistance to withdrawal of the tape from the magazine, said compensating means including stationary means having an arcuate surface for frictional contact with the tape for resistance to travel thereof and means in contact with the tape departing from said stationary means and yieldingly pressing against the tape laterally thereof in a direction to increase the extent of the tape that is in frictional contact with said arcuate surface thereby to increase said resistance to travel in response to local acceleration of the tape at the stationary means.

15. A combination as set forth in claim 14 which includes means to damp the movements of said laterally pressing means.

16. In a system for running an endless record tape past a transducing station, the combination of a magazine to store the major portion of the endless tape in random serpentine folds, a first side of said magazine being adjacent said station, said magazine having a tape entrance on said first side and a tape exit spaced across the magazine from the entrance, a loop of the tape extending from said exit past said station to said entrance, drive means outside said first side of the magazine adjacent said entrance, said drive means engaging said loop to drive the tape and to thrust the tape toward the magazine, means adjacent and outside said first side of the magazine engaging said loop to yieldingly resist travel of the tape thereby to cooperate with said driving means to place the tape under tension at said station, and means adjacent and outside a second side of said magazine that is adjacent said first side to guide said loop from said exit to said travel-resisting means, said guiding means including means to yieldingly resist travel of the loop from said exit and including means to yieldingly offset the loop to permit variation in the rate of travel of the loop out of said exit with the loop travelling at a constant rate past said transducing station.

17. In a system employing a travelling endless record tape with sprocket holes therein and with a recording coating on one face of the tape, the tape being wider than the recording zone of said coated face, and in which a major portion of the travelling tape is stored in a magazine with a loop of the tape extending from an exit of the magazine to an entrance to the magazine, an array of components outside the magazine for driving said loop and for deriving information from the loop, said array including means providing an arcuate surface for contact with the uncoated face of said tape to guide the tape along a pre-determined arcuate path, transducing means adjacent said arcuate path but spaced therefrom to derive data from the coated face of the tape without contact with the tape coating, drive means in engagement with the tape between said guide means and said entrance to pull the tape across said arcuate surface and to thrust the tape toward said entrance, said drive means engaging the coated face of the tape outside said recording zone and being spaced out of contact with the coated face in said recording zone, and drag means between said guide means and said exit of the magazine in engagement with the tape to yieldingly resist travel of the tape thereby to cooperate with said drive means to maintain the tape in tension at said arcuate surface, said drag means engaging both faces of the tape but being spaced away from said recording zone of the coated face of the tape.

18. A combination as set forth in claim 4 in which said drive sprocket has at least one circumferential portion with sprocket teeth to engage the sprocket holes of the tape and another circumferential portion registering with the longitudinal zone of the coating on which recordings are made, said one circumferential portion of the drive sprocket engaging the coated face of the tape, said another circumferential portion of the drive sprocket being reduced in diameter to avoid contact with the coating in said longitudinal zone.

References Cited in the file of this patent

UNITED STATES PATENTS

| | | |
|---|---|---|
| 1,525,939 | Holmes | Feb. 10, 1925 |
| 2,085,439 | Morlock | June 29, 1937 |
| 2,238,719 | De Tartas | Apr. 15, 1941 |
| 2,499,700 | Tinkham et al. | Mar. 7, 1950 |
| 2,542,506 | Gibson | Feb. 20, 1951 |
| 2,612,566 | Anderson et al. | Sept. 30, 1952 |
| 2,678,173 | Phelps | May 11, 1954 |
| 2,782,041 | Muller | Feb. 19, 1957 |